(12) United States Patent
St. Hilaire et al.

(10) Patent No.: US 11,885,969 B2
(45) Date of Patent: *Jan. 30, 2024

(54) FLAT SPECTRAL RESPONSE GRATINGS USING HIGH INDEX MATERIALS

(71) Applicant: Magic Leap, Inc., Plantation, FL (US)

(72) Inventors: Pierre St. Hilaire, Belmont, CA (US); Mohammadreza Khorasaninejad, Milpitas, CA (US); Dianmin Lin, Los Altos, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/691,868

(22) Filed: Mar. 10, 2022

(65) Prior Publication Data

US 2022/0197040 A1    Jun. 23, 2022

Related U.S. Application Data

(63) Continuation of application No. 16/919,718, filed on Jul. 2, 2020, now Pat. No. 11,300,791.
(Continued)

(51) Int. Cl.
*G02B 27/01* (2006.01)
*F21V 8/00* (2006.01)

(52) U.S. Cl.
CPC ....... *G02B 27/0172* (2013.01); *G02B 6/0038* (2013.01); *G02B 6/0061* (2013.01);
(Continued)

(58) Field of Classification Search
CPC .............. G02B 27/0172; G02B 6/0038; G02B 6/0061; G02B 6/0076; G02B 2027/0112;
(Continued)

(56) References Cited

U.S. PATENT DOCUMENTS 7,420,735 B2 *   9/2008   Hikichi ................ G02B 5/1866
                                                            359/569
7,758,185 B2    7/2010   Lewis
(Continued)

FOREIGN PATENT DOCUMENTS

CA    2815447    2/2019
CA    2821401    4/2019
(Continued)

OTHER PUBLICATIONS

Azuma, "A Survey of Augmented Reality," Presence: Teleoperators and Virtual Environments, Aug. 1997, 6(4):355-385.
(Continued)

*Primary Examiner* — John Bedtelyon
(74) *Attorney, Agent, or Firm* — Fish & Richardson P.C.

(57) ABSTRACT

An example head-mounted display device includes a plurality of optical elements in optical communication. The optical elements are configured to project an image in a field of view of a user wearing the head-mounted display device. A first optical element is configured to receive light from a second optical element. The first optical element defines a grating at along a periphery of the first optical element. The grating includes a plurality of protrusions extending from a base portion of the first optical element. The protrusions include a first material having a first optical dispersion profile for visible wavelengths of light. The grating also includes a second material disposed between at least some of the plurality of protrusions along the base portion of the first optical element. The second material has a second optical dispersion profile for visible wavelengths of light.

20 Claims, 15 Drawing Sheets

Related U.S. Application Data

(60) Provisional application No. 62/889,650, filed on Aug. 21, 2019.

(52) U.S. Cl.
CPC .... G02B 6/0076 (2013.01); *G02B 2027/0112* (2013.01); *G02B 2027/0118* (2013.01)

(58) Field of Classification Search
CPC .............. G02B 2027/0118; G02B 6/34; G02B 5/1847; G02B 27/0081; G02B 27/4288; G02B 2027/0123; G02B 2027/0116
See application file for complete search history.

(56) References Cited

U.S. PATENT DOCUMENTS

| | | | |
|---|---|---|---|
| 8,353,594 B2 | 1/2013 | Lewis | |
| 8,696,113 B2 | 4/2014 | Lewis | |
| 8,733,927 B1 | 5/2014 | Lewis | |
| 8,733,928 B1 | 5/2014 | Lewis | |
| 9,010,929 B2 | 4/2015 | Lewis | |
| 9,235,064 B2 | 1/2016 | Lewis | |
| 9,239,473 B2 | 1/2016 | Lewis | |
| 9,244,293 B2 | 1/2016 | Lewis | |
| 9,250,445 B2 | 2/2016 | Tosaya et al. | |
| 9,372,347 B1 | 6/2016 | Levola et al. | |
| 9,658,473 B2 | 5/2017 | Lewis | |
| 9,874,749 B2 | 1/2018 | Bradski et al. | |
| 10,151,937 B2 | 12/2018 | Lewis | |
| 10,156,725 B2 | 12/2018 | TeKolste et al. | |
| 10,185,147 B2 | 1/2019 | Lewis | |
| 10,241,332 B2 | 3/2019 | Vallius | |
| 10,495,790 B2 | 12/2019 | Smith et al. | |
| 10,643,392 B2 | 5/2020 | Schowengerdt | |
| 10,670,805 B2 | 6/2020 | Tervo | |
| 2003/0231395 A1* | 12/2003 | Nakai ................ | G02B 5/1876 359/558 |
| 2006/0152809 A1* | 7/2006 | Smith ................ | G02B 5/1861 359/569 |
| 2007/0086703 A1 | 4/2007 | Kirk et al. | |
| 2015/0063753 A1* | 3/2015 | Evans ..................... | H01S 5/12 438/31 |
| 2015/0086163 A1* | 3/2015 | Valera ................ | G02B 6/0065 427/163.2 |
| 2015/0185413 A1* | 7/2015 | Greiner .............. | B29D 11/0074 427/163.1 |
| 2016/0274281 A1 | 9/2016 | Lutolf et al. | |
| 2017/0131460 A1 | 5/2017 | Lin et al. | |
| 2017/0184848 A1 | 6/2017 | Vallius | |
| 2017/0322418 A1 | 11/2017 | Lin et al. | |
| 2018/0231702 A1 | 8/2018 | Lin et al. | |
| 2019/0162908 A1 | 5/2019 | Moebius et al. | |
| 2019/0187474 A1 | 6/2019 | Bhargave et al. | |
| 2019/0227316 A1 | 7/2019 | Lee et al. | |
| 2021/0055557 A1 | 2/2021 | St. Hilaire et al. | |

FOREIGN PATENT DOCUMENTS

| | | |
|---|---|---|
| CN | 109073883 | 12/2018 |
| CN | 104914577 | 3/2019 |
| CN | 106471428 | 10/2019 |
| CN | 107250887 | 1/2020 |
| CN | 106664400 | 8/2020 |
| JP | 2007293938 A | 11/2007 |
| JP | 2008042797 A | 2/2008 |
| JP | 5060704 | 10/2012 |
| JP | 5698297 | 4/2015 |
| JP | 2017522587 | 8/2017 |
| JP | 2018-538582 | 12/2018 |
| JP | 2020510228 | 4/2020 |
| JP | 6738336 | 8/2020 |
| KR | 20150136601 | 12/2015 |
| KR | 20180124147 | 11/2018 |
| TW | I461735 | 11/2014 |
| WO | WO 2016133886 | 8/2016 |

OTHER PUBLICATIONS

Azuma, "Predictive tracking for augmented reality." Dissertation for the degree of Doctor of Philosophy, University of North Carolina at Chapel Hill, Department of Computer Science, Feb. 1995, 262 pages.

Bimber et al., "Spatial Augmented Reality Merging Real and Virtual Worlds," A K Peters, Ltd. (ed.), 2005, 393 pages.

hitl. washington.edu [online], "Hardware," available on or before Oct. 13, 2005, via Internet Archive: Wayback Machine URL <https://web.archive.org/web/20051013062315/http:/www.hitl.washington.edu:80/artoolkit/documentation/hardware.htm>, retrieved on Mar. 3, 2021, URL <http://www.hitl.washington.edu/artoolkit/documentation/hardware.htm>, 3 pages.

Jacob, "Eye Tracking in Advanced Interface Design," Virtual environments and advanced interface design, 1995, 258:288, 50 pages.

PCT International Search Report and Written Opinion in International Appln. No. PCT/US2020/040657, dated Sep. 28, 2020, 12 pages.

Tanriverdi et al., "Interacting with Eye Movements in Virtual Environments," Proc. of the SIGCHI Conference on Human Factors in Computing Systems, 2000, pp. 265-272.

Office Action in Japanese Appln. No. 2022-510973, dated Aug. 1, 2023, 8 pages (with English translation).

\* cited by examiner

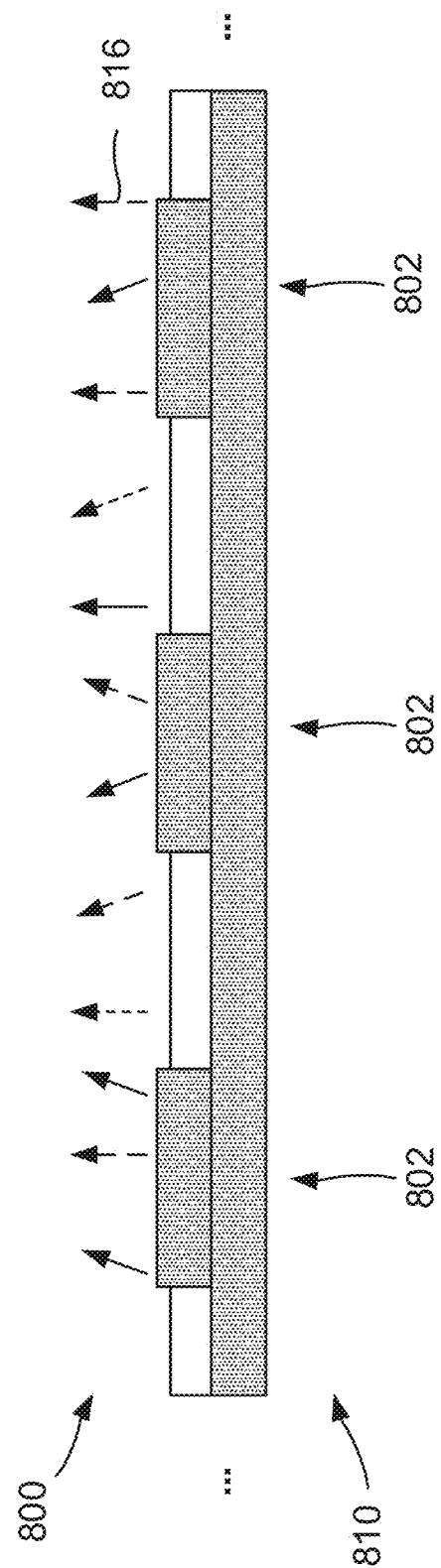

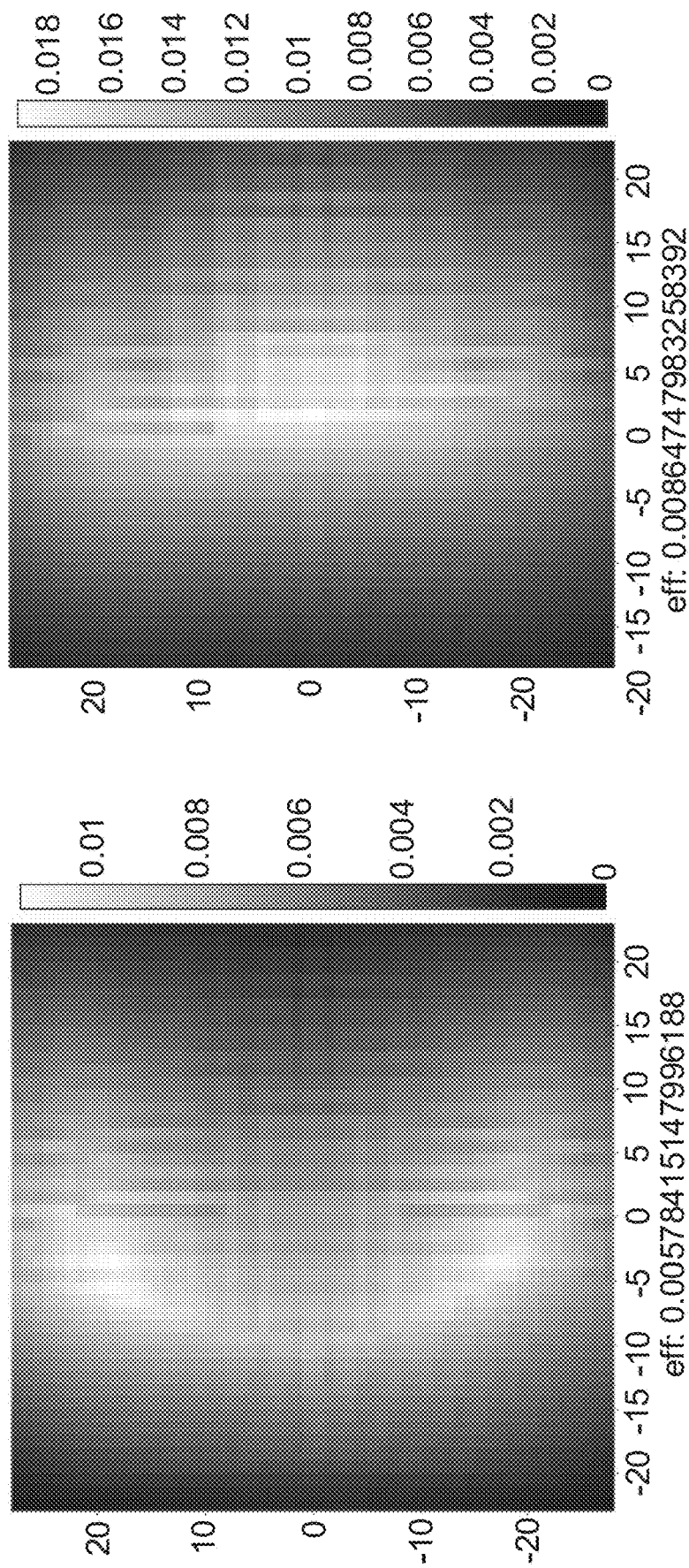

FLAT SPECTRAL RESPONSE GRATINGS USING HIGH INDEX MATERIALS

CROSS-REFERENCE TO RELATED APPLICATIONS

This application is a continuation of U.S. application Ser. No. 16/919,718, filed Jul. 2, 2020, which claims the benefit of U.S. Provisional Application No. 62/889,650, filed Aug. 21, 2019, which is hereby incorporated by reference in its entirety.

TECHNICAL FIELD

This disclosure relates to optical elements having grating structures and methods for producing the same.

BACKGROUND

Optical imaging systems, such as wearable display systems (e.g., wearable display headsets) can include one or more eyepieces that present projected images to a user. Eyepieces can be constructed using thin layers of one or more highly refractive materials. As examples, eyepieces can be constructed from one or more layers of highly refractive glass, silicon, metal, or polymer substrates.

In some cases, an eyepiece can be patterned (e.g., with one or more light diffractive nanostructures) such that it projects an image according to a particular focal depth. For an example, to a user viewing a patterned eyepiece, the projected image can appear to be a particular distance away from the user.

Further, multiple eyepieces can be used in conjunction to project a simulated three-dimensional image. For example, multiple eyepieces—each having a different pattern—can be layered one atop another, and each eyepiece can project a different depth layer of a volumetric image. Thus, the eyepieces can collectively present the volumetric image to the user across three-dimensions. This can be useful, for example, in presenting the user with a "virtual reality" environment.

SUMMARY

This disclosure describes optical elements having certain grating structures and methods for producing the same. One or more of the described implementations can be used to produce optical elements that exhibit a substantially constant diffraction efficiency across a particular spectrum (e.g., the visible spectrum). In some implementations, the optical elements can be suitable for use as eyepieces in a wearable display headset.

In an example implementation, an optical element includes one or more grating structures defined along its periphery (e.g., along an interface between the optical element and another optical element, or along an interface between the optical element and air). The grating structures are formed from one or more high index materials, such as titanium dioxide ($TiO_2$), silicon carbide (SiC), and/or lithium niobate ($LiNbO_3$). In particular, the differential dispersion of these materials can be used to achieve a uniform diffraction efficiency across the visible spectrum. This can be beneficial, for example, in fabricating of single waveguide layer eyepieces (e.g., for use in a wearable display headset) that can display a high-quality multi-color image (e.g., a red-green-blue image) having high color uniformity over a wide field of view.

In an aspect, a head-mounted display device includes a plurality of optical elements in optical communication. The plurality of optical elements is configured, during operation of the head-mounted display device, to project an image in a field of view of a user wearing the head-mounted display device. A first optical element of the plurality of optical elements is configured to receive light from a second optical element of the plurality of optical elements. The first optical element defines a grating at along a periphery of the first optical element. The grating includes a plurality of protrusions extending from a base portion of the first optical element. The protrusions include a first material having a first optical dispersion profile for visible wavelengths of light. The grating also includes a second material disposed between at least some of the plurality of protrusions along the base portion of the first optical element. The second material has a second optical dispersion profile for visible wavelengths of light.

Implementations of this aspect can include one or more of the following features.

In some implementations, the second material can be titanium dioxide ($TiO_2$).

In some implementations, the first material can be silicon carbide (SiC).

In some implementations, the first material can be lithium niobate ($LiNbO_3$).

In some implementations, the base portion of the first optical element can include the first material.

In some implementations, the base portion of the first optical element can be composed of the same material as the plurality of protrusions.

In some implementations, the base portion of the first optical element can be integrally formed with the plurality of protrusions.

In some implementations, each protrusion can have a substantially rectangular cross-section.

In some implementations, each protrusion can extend a first height above a surface of the base portion of the first optical element. The second material can extend a second height above the surface of the base portion of the first optical element, the second height being different from the first height.

In some implementations, the first height can be greater than the second height.

In some implementations, the first height can be approximately 90 nm.

In some implementations, the second height can be approximately 80 nm.

In some implementations, the grating can repeat according to a period along a length of the base portion of the first optical element.

In some implementations, the period can correspond to a length of approximately 208 nm.

In some implementations, each protrusion can have a substantially equal width.

In some implementations, each protrusion can have a width of approximately 140 nm.

In some implementations, the first and second optical dispersion profiles can reduce variations between a first diffraction efficiency of the grating with respect to a first wavelength of incident light, a second diffraction efficiency of the grating with respect to a second wavelength of incident light, and a third diffraction efficiency of the grating with respect to a third wavelength of incident light with respect to a range of incident angles compared to a grating composed of only the first material.

In some implementations, the first wavelength can correspond to first color in the visible spectrum, the second wavelength can correspond to a second color in the visible spectrum, and the third wavelength can corresponds to third color in the visible spectrum, the first color, the second color, and third color being different from one another.

In some implementations, the first color can be red, the second color can be green, and the third color can be blue.

In some implementations, the range of incident angles can be approximately −20° to 20°.

In another aspect, a method of constructing a head-mounted display device includes providing a first optical element including a grating formed along a first surface of the first optical element. The grating includes a plurality of protrusions including a first material having a first optical dispersion profile for visible wavelengths of light, and a second material deposited between at least some of the plurality of protrusions along the first surface of the first optical element. The second material has a second optical dispersion profile for visible wavelengths of light, The method also includes positioning the first optical element in optical communication with a second optical element in the head-mounted display device.

Implementations of this aspect can include one or more of the following features.

In some implementations, the second material can be titanium dioxide ($TiO_2$).

In some implementations, the first material can be silicon carbide (SiC).

In some implementations, the first material can be lithium niobate ($LiNbO_3$).

In some implementations, the grating can be formed by etching a plurality of channels onto the first optical element along the first surface, each channel having a first depth, and depositing the second material between at least some of the plurality of protrusions along the first surface.

In some implementations, each channel can have a substantially rectangular cross-section.

In some implementations, each channel can have a substantially equal width.

In some implementations, each channel can have a width of approximately 68 nm.

In some implementations depositing the second material can include depositing the second material into at least some of the channels.

In some implementations, depositing the second material can include sputtering the second material into at least some of the channels.

In some implementations, the second material can be deposited such that it extends a first height within the channel.

In some implementations, the first depth can be greater than the first height.

In some implementations, the first depth can be approximately 90 nm.

In some implementations, the first height can be approximately 80 nm.

In some implementations, the grating can be formed according to a period along a length of the first surface.

In some implementations, the period can correspond to a length of approximately 208 nm.

The details of one or more embodiments are set forth in the accompanying drawings and the description below. Other features and advantages will be apparent from the description and drawings, and from the claims.

DESCRIPTION OF DRAWINGS

FIGS. 8B and 8C show, in cross-section, example optical elements having the repeating units shown in FIG. 5A.

FIGS. 10A and 10B show intensity maps of light emitted by example eyepieces having example grating structures.

DETAILED DESCRIPTION

Figure 1:
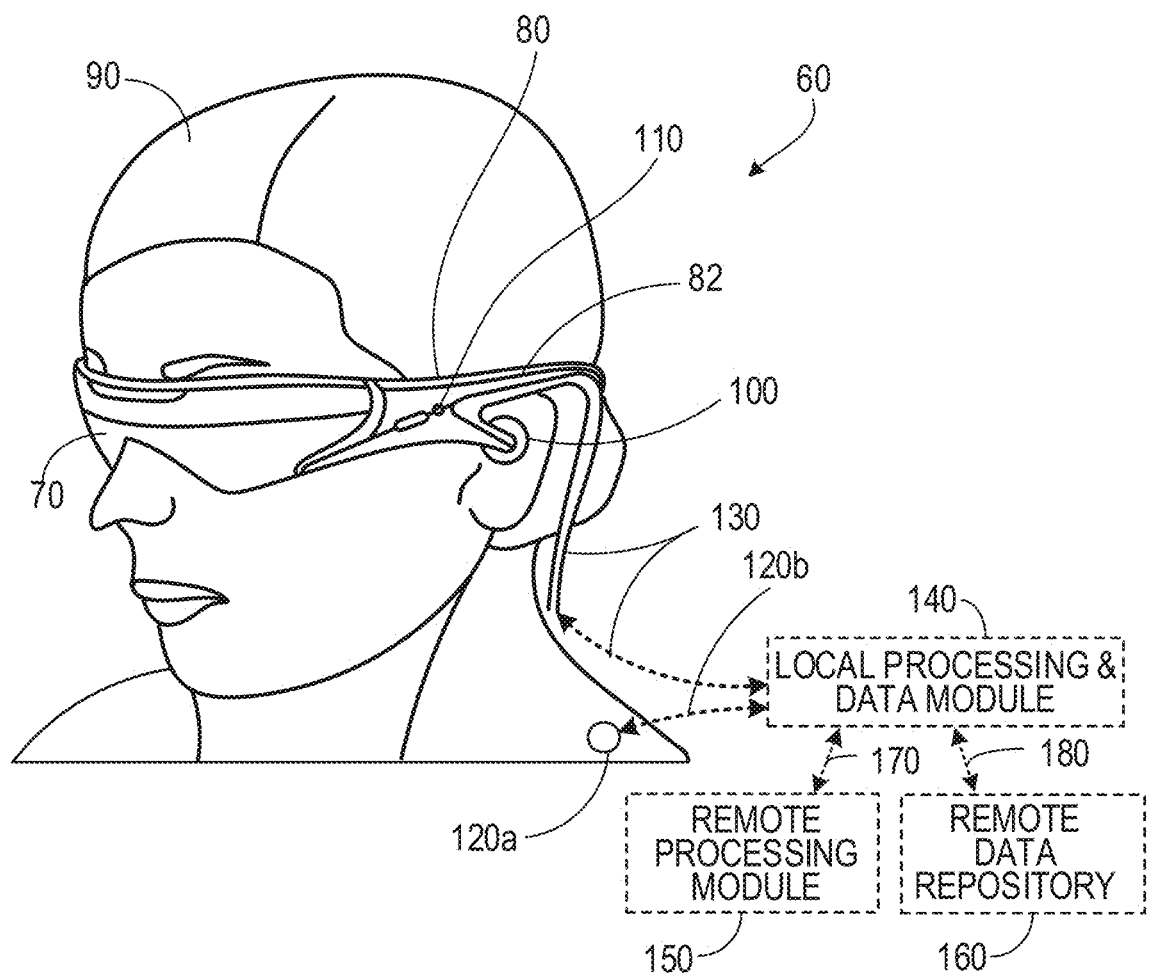
FIG. 1 shows an example of a wearable display system.

FIG. 1 illustrates an example wearable display system 60 that incorporates a high index material grating. The display system 60 includes a display or eyepiece 70, and various mechanical and electronic modules and systems to support the functioning of that display 70. The display 70 may be coupled to a frame 80, which is wearable by a display system user 90 and which is configured to position the display 70 in front of the eyes of the user 90. The display 70 may be considered eyewear in some embodiments. In some embodiments, a speaker 100 is coupled to the frame 80 and is positioned adjacent the ear canal of the user 90. The display system may also include one or more microphones 110 to detect sound. The microphone 110 can allow the user to provide inputs or commands to the system 60 (e.g., the selection of voice menu commands, natural language questions, etc.), and/or can allow audio communication with other persons (e.g., with other users of similar display systems). The microphone 110 can also collect audio data from the user's surroundings (e.g., sounds from the user and/or environment). In some embodiments, the display system may also include a peripheral sensor 120 a, which may be separate from the frame 80 and attached to the body of the user 90 (e.g., on the head, torso, an extremity, etc.). The peripheral sensor 120 a may acquire data characterizing the physiological state of the user 90 in some embodiments.

The display 70 is operatively coupled by a communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or removably attached to the user 90 (e.g., in a backpack-style configuration or in a belt-coupling style configuration). Similarly, the sensor 120 *a* may be operatively coupled by communications link 120 *b* (e.g., a wired lead or wireless connectivity) to the local processor and data module 140. The local processing and data module 140 may include a hardware processor, as well as digital memory, such as non-volatile memory (e.g., flash memory or a hard disk drive), both of which may be utilized to assist in the processing, caching, and storage of data. The data may include data 1) captured from sensors (which may be, e.g., operatively coupled to the frame 80 or otherwise attached to the user 90), such as image capture devices (e.g., cameras), microphones, inertial measurement units, accelerometers, compasses, GPS units, radio devices, gyros, and/or other sensors disclosed herein; and/or 2) acquired and/or processed using a remote processing module 150 and/or a remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and the remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone devices that communicate with the local processing and data module 140 by wired or wireless communication pathways.

The remote processing module 150 may include one or more processors to analyze and process data, such as image and audio information. In some embodiments, the remote data repository 160 may be a digital data storage facility, which may be available through the internet or other networking configuration in a "cloud" resource configuration. In some embodiments, the remote data repository 160 may include one or more remote servers, which provide information (e.g., information for generating augmented reality content) to the local processing and data module 140 and/or the remote processing module 150. In other embodiments, all data is stored and all computations are performed in the local processing and data module, allowing fully autonomous use from a remote module.

Figure 2A:
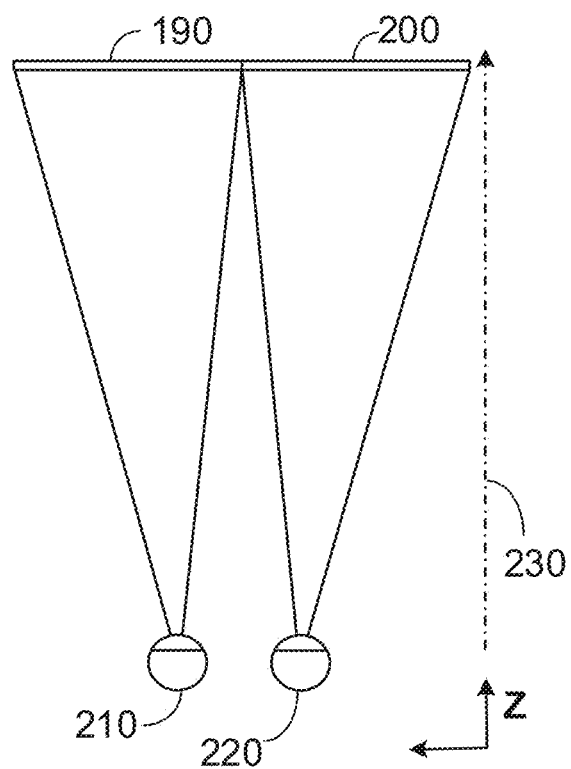
FIG. 2A shows a conventional display system for simulating three-dimensional image data for a user.

The perception of an image as being "three-dimensional" or "3-D" may be achieved by providing slightly different presentations of the image to each eye of the user. FIG. 2A illustrates a conventional display system for simulating three-dimensional image data for a user. Two distinct images 190, 200—one for each eye 210, 220—are output to the user. The images 190, 200 are spaced from the eyes 210, 220 by a distance 230 along an optical or z-axis that is parallel to the line of sight of the user. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

However, the human visual system is complicated and providing a realistic perception of depth is challenging. For example, many users of conventional "3-D" display systems find such systems to be uncomfortable or may not perceive a sense of depth at all. Objects may be perceived as being "three-dimensional" due to a combination of vergence and accommodation. Vergence movements (e.g., rotation of the eyes so that the pupils move toward or away from each other to converge the respective lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, under normal conditions, a change in vergence will trigger a matching change in accommodation of lens shape and pupil size. As noted herein, many stereoscopic or "3-D" display systems display a scene using slightly different presentations (and, so, slightly different images) to each eye such that a three-dimensional perspective is perceived by the human visual system. Such systems can be uncomfortable for some users, however, since they simply provide image information at a single accommodated state and work against the "accommodation-vergence reflex." Display systems that provide a better match between accommodation and vergence may form more realistic and comfortable simulations of three-dimensional image data.

Figure 2B:
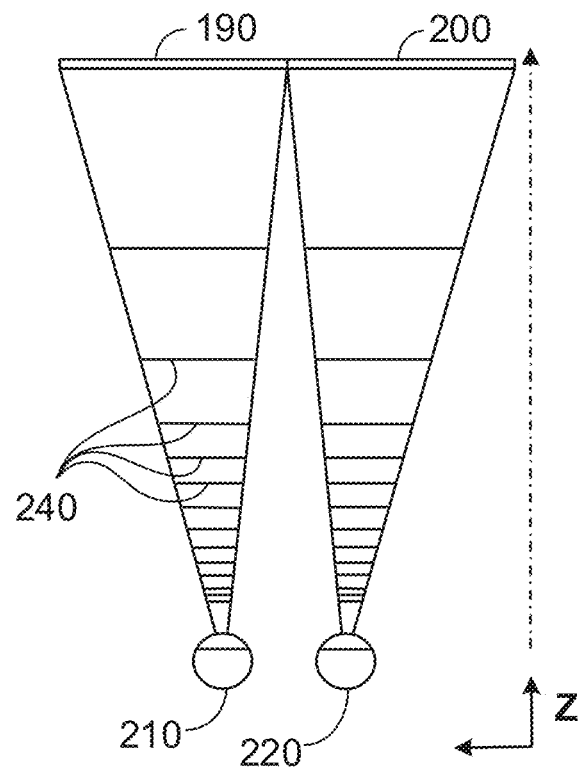
FIG. 2B shows aspects of an approach for simulating three-dimensional image data using multiple depth planes.

FIG. 2B illustrates aspects of an approach for simulating three-dimensional image data using multiple depth planes. With reference to FIG. 2B, the eyes 210, 220 assume different accommodated states to focus on objects at various distances on the z-axis. Consequently, a particular accommodated state may be said to be associated with a particular one of the illustrated depth planes 240, which has an associated focal distance, such that objects or parts of objects in a particular depth plane are in focus when the eye is in the accommodated state for that depth plane. In some embodiments, three-dimensional image data may be simulated by providing different presentations of an image for each of the eyes 210, 220, and also by providing different presentations of the image corresponding to multiple depth planes. While the respective fields of view of the eyes 210, 220 are shown as being separate for clarity of illustration, they may overlap, for example, as distance along the z-axis increases. In addition, while the depth planes are shown as being flat for ease of illustration, it will be appreciated that the contours of a depth plane may be curved in physical space, such that all features in a depth plane are in focus with the eye in a particular accommodated state.

Figure 3A:
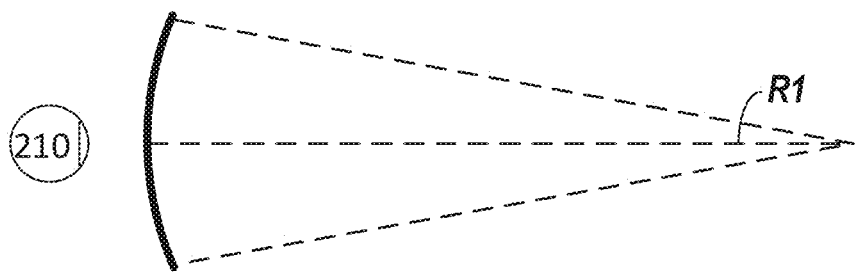
FIGS. 3A-3C show relationships between radius of curvature and focal radius.
Figure 3B:
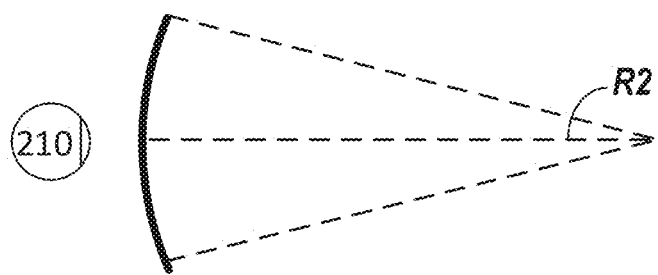
Figure 3C:
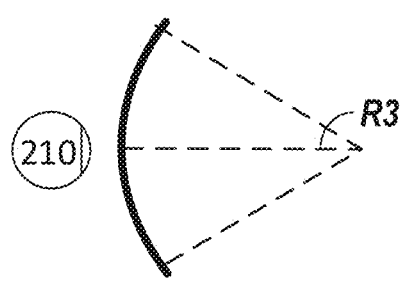

The distance between an object and an eye 210 or 220 may also change the amount of divergence of light from that object, as viewed by that eye. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the user's eye 210. While only a single eye 210 is illustrated for clarity of illustration in FIGS. 3A-3C and other figures herein, it will be appreciated that the discussions regarding the eye 210 may be applied to both eyes 210 and 220 of a user.

A highly believable simulation of perceived depth may be achieved by providing, to the eye, different presentations of an image corresponding to each of a limited number of depth planes. The different presentations may be separately focused by the user's eye, thereby helping to provide the user with depth cues based on the amount of accommodation of the eye required to bring into focus different image features for the scene located on different depth planes and/or based on observing different image features on different depth planes being out of focus.

Figure 4:
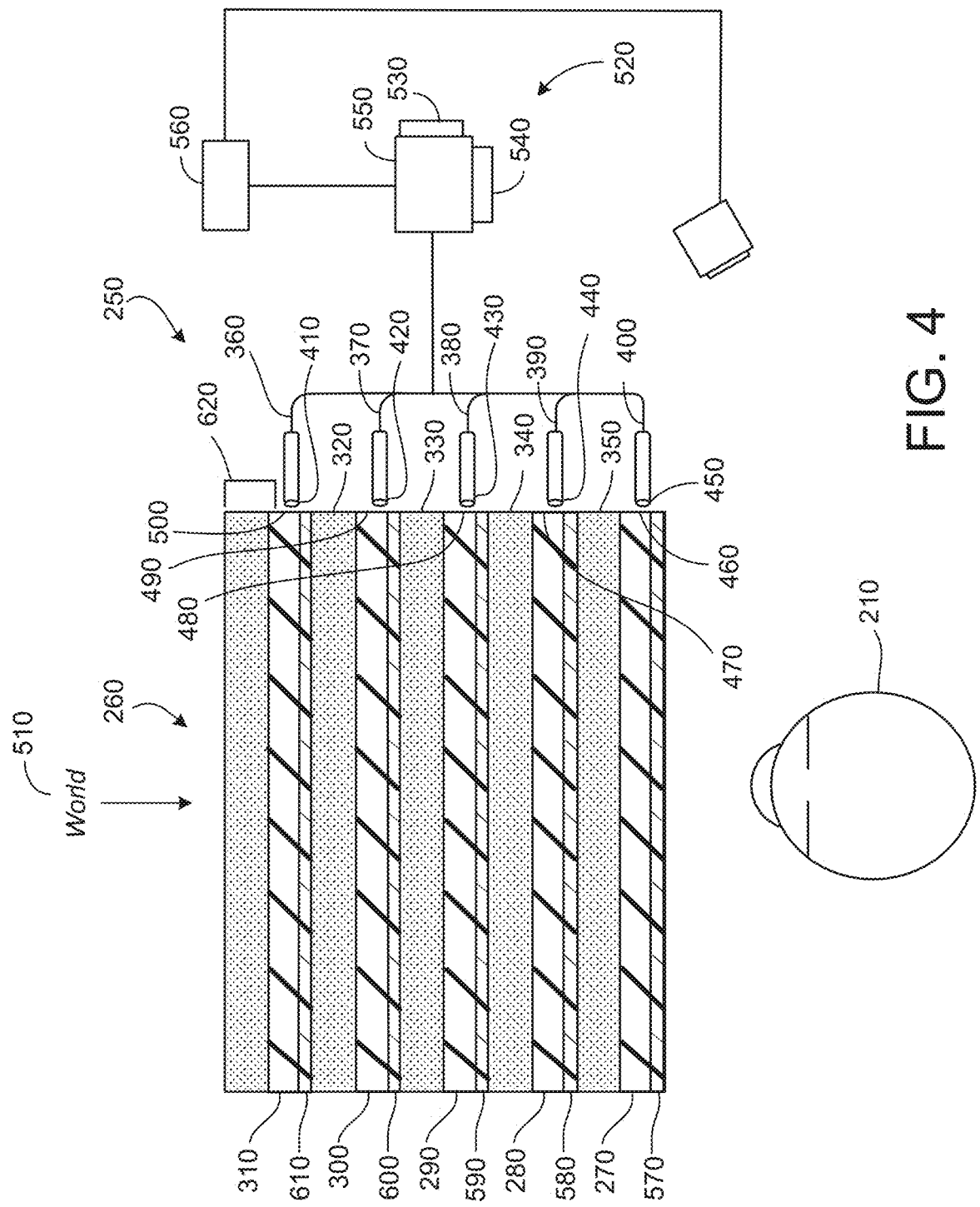
FIG. 4 shows an example of a waveguide stack for outputting image information to a user in an AR eyepiece.

FIG. 4 illustrates an example of a waveguide stack for outputting image information to a user in an AR eyepiece. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 1, with FIG. 4 schematically showing some parts of that system 60 in greater detail. For example, the waveguide assembly 260 may be part of the display 70 of FIG. 1. It will be appreciated that the display system 250 may be considered a light field display in some embodiments.

The waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of each respective image injection device 360, 370, 380, 390, 400 and is injected into a corresponding input surface 460, 470, 480, 490, 500 of the respective waveguides 270, 280, 290, 300, 310. In some embodiments, the each of the input surf aces 460, 4 70, 480, 490, 500 may be an edge of a corresponding waveguide, or may be part of a major surface of the corresponding waveguide (that is, one of the waveguide surfaces directly facing the world 510 or the user's eye 210). In some embodiments, a beam of light (e.g., a collimated beam) may be injected into each waveguide and may be replicated, such as by sampling into beamlets by diffraction, in the waveguide and then directed toward the eye 210 with an amount of optical power corresponding to the depth plane associated with that particular waveguide. In some embodiments, a single one of the image injection devices 360, 370, 380, 390, 400 may be associated with, and inject light into, a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may transmit image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors.

In some embodiments, the light injected into the waveguides 270, 280, 290, 300, 310 is provided by a light projector system 520, which includes a light module 530, which may include a light source or light emitter, such as a light emitting diode (LED). The light from the light module 530 may be directed to, and modulated by, a light modulator 540 (e.g., a spatial light modulator), via a beamsplitter (BS) 550. The light modulator 540 may spatially and/or temporally change the perceived intensity of the light injected into the waveguides 270, 280, 290, 300, 310. Examples of spatial light modulators include liquid crystal displays (LCD), including a liquid crystal on silicon (LCOS) displays, and digital light processing (DLP) displays.

In some embodiments, the light projector system 520, or one or more components thereof, may be attached to the frame 80 (FIG. 1). For example, the light projector system 520 may be part of a temporal portion (e.g., ear stem 82) of the frame 80 or disposed at an edge of the display 70. In some embodiments, the light module 530 may be separate from the BS 550 and/or light modulator 540.

In some embodiments, the display system 250 may be a scanning fiber display comprising one or more scanning fibers to project light in various patterns (e.g., raster scan, spiral scan, Lissajous patterns, etc.) into one or more waveguides 270, 280, 290, 300, 310 and ultimately into the eye 210 of the user. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. One or more optical fibers may transmit light from the light module 530 to the one or more waveguides 270, 280, 290, 300, and 310. In addition, one or more intervening optical structures may be provided between the scanning fiber, or fibers, and the one or more waveguides 270, 280, 290, 300, 310 to, for example, redirect light exiting the scanning fiber into the one or more waveguides 270,280,290,300,310.

A controller 560 controls the operation of the stacked waveguide assembly 260, including operation of the image injection devices 360, 370, 380, 390, 400, the light source 530, and the light modulator 540. In some embodiments, the controller 560 is part of the local data processing module 140. The controller 560 includes programing (e.g., instructions in a non-transitory medium) that regulates the timing and provision of image information to the waveguides 270, 280, 290, 300, 310. In some embodiments, the controller may be a single integral device, or a distributed system connected by wired or wireless communication channels. The controller 560 may be part of the processing modules 140 or 150 (FIG. 1) in some embodiments.

The waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be output by the waveguide at locations at which the light propagating in the waveguide strikes a light extracting optical element. The out-coupling optical elements 570, 580, 590, 600, 610 may be, for example, diffractive optical features, including diffractive gratings, as discussed further herein. While the out-coupling optical elements 570, 580, 590, 600, 610 are illustrated as being disposed at the bottom major surfaces of the waveguides 270, 280, 290, 300, 310, in some embodiments they may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

Each waveguide 270, 280, 290, 300, 310 may output light to form an image corresponding to a particular depth plane. For example, the waveguide 270 nearest the eye may deliver collimated beams of light to the eye 210. The collimated beams of light may be representative of the optical infinity focal plane. The next waveguide up 280 may output collimated beams of light which pass through the first lens 350 (e.g., a negative lens) before reaching the eye 210. The first lens 350 may add a slight convex wavefront curvature to the collimated beams so that the eye/brain interprets light coming from that waveguide 280 as originating from a first focal plane closer inward toward the eye 210 from optical infinity. Similarly, the third waveguide 290 passes its output light through both the first lens 350 and the second lens 340 before reaching the eye 210. The combined optical power of the first lens 350 and the second lens 340 may add another incremental amount of wavefront curvature so that the eye/brain interprets light coming from the third waveguide 290 as originating from a second focal plane that is even closer inward from optical infinity than was light from the second waveguide 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate optical power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may output images set to the same depth plane, or multiple subsets of the waveguides 270, 280, 290, 300, 310 may output images set to the same plurality of depth planes, with one set for each depth plane. This can provide advantages for forming a tiled image to provide an expanded field of view at those depth planes.

The out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features with a diffractive efficiency sufficiently low such that only a portion of the power of the light in a beam is re-directed toward the eye 210 with each interaction, while the rest continues to move through a waveguide via TIR. Accordingly, the exit pupil of the light module 530 is replicated across the waveguide to create a plurality of output beams carrying the image information from light source 530, effectively expanding the number of locations where the eye 210 may intercept the replicated light source exit pupil. These diffractive features may also have a variable diffractive efficiency across their geometry to improve uniformity of light output by the waveguide.

In some embodiments, one or more diffractive features may be switchable between "on" states in which they actively diffract, and "off" states in which they do not significantly diffract. For instance, a switchable diffractive element may include a layer of polymer dispersed liquid crystal in which microdroplets form a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and IR light cameras) may be provided to capture images of the eye 210, parts of the eye 210, or at least a portion of the tissue surrounding the eye 210 to, for example, detect user inputs, extract biometric information from the eye, estimate and track the gaze direction of the eye, to monitor the physiological state of the user, etc. In some embodiments, the camera assembly 630 may include an image capture device and a light source to project light (e.g., IR or near-IR light) to the eye, which may then be reflected by the eye and detected by the image capture device. In some embodiments, the light source includes light emitting diodes ("LEDs"), emitting in IR or near-IR. In some embodiments, the camera assembly 630 may be attached to the frame 80 (FIG. 1) and may be in electrical communication with the processing modules 140 or 150, which may process image information from the camera assembly 630 to make various determinations regarding, for example, the physiological state of the user, the gaze direction of the wearer, iris identification, etc. In some embodiments, one camera assembly 630 may be utilized for each eye, to separately monitor each eye.

Figure 5:
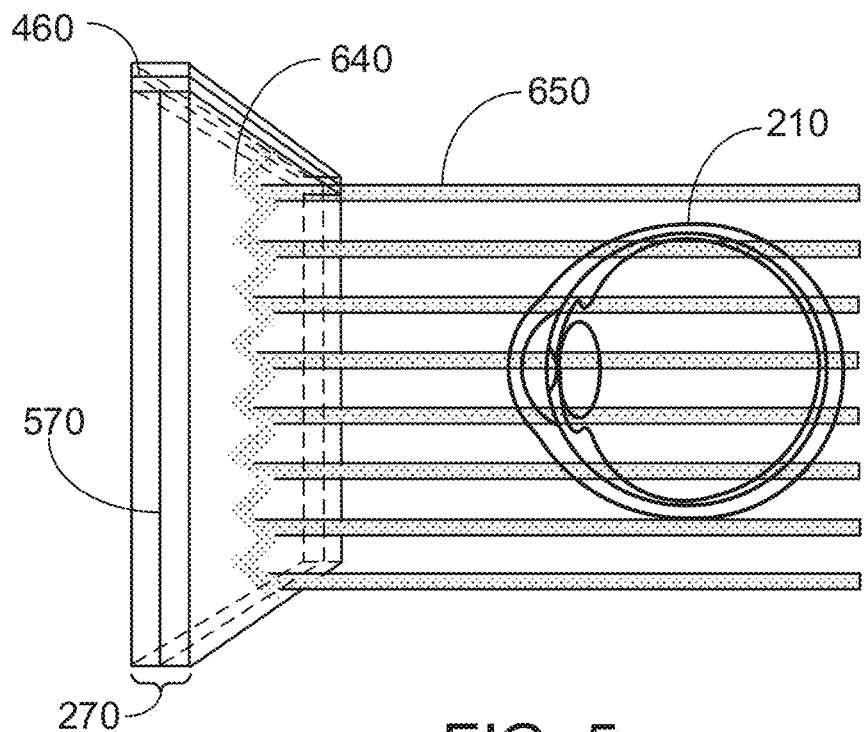
FIGS. 5 and 6 show examples of exit beams outputted by a waveguide.
Figure 6:
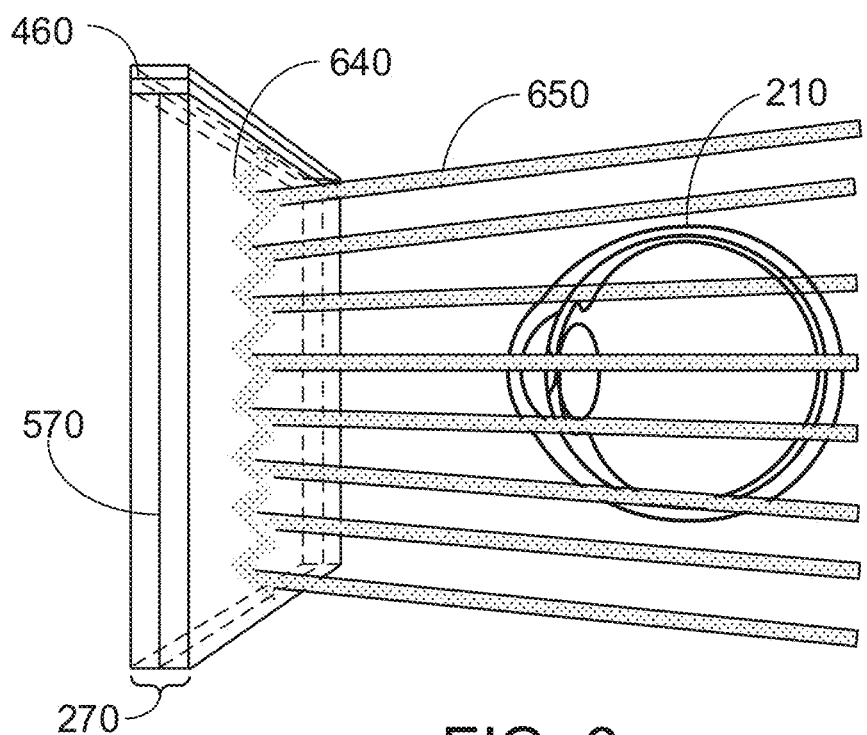

FIG. 5 illustrates an example of exit beams output by a waveguide. One waveguide is illustrated (with a perspective view), but other waveguides in the waveguide assembly 260 (FIG. 4) may function similarly. Light 640 is injected into the waveguide 270 at the input surface 460 of the waveguide 270 and propagates within the waveguide 270 by TIR. Through interaction with diffractive features, light exits the waveguide as exit beams 650. The exit beams 650 replicate the exit pupil from a projector device which projects images into the waveguide. Any one of the exit beams 650 includes a sub-portion of the total energy of the input light 640. And in a perfectly efficient system, the summation of the energy in all the exit beams 650 would equal the energy of the input light 640. The exit beams 650 are illustrated as being substantially parallel in FIG. 6 but, as discussed herein, some amount of optical power may be imparted depending on the depth plane associated with the waveguide 270. Parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, as shown in FIG. 6, which would require the eye 210 to accommodate to a closer distance to bring it into focus on the retina and would be interpreted by the brain as light from a distance closer to the eye 210 than optical infinity.

Additional information regarding wearable display systems (e.g., including optical elements used in wearable display systems) can be found in U.S. patent application Ser. No. 16/221,359, filed Dec. 14, 2018, and entitled "EYE-PIECES FOR AUGMENTED REALITY DISPLAY SYSTEM," the contents of which are incorporated by reference in their entirety.

As noted above, wearable display system 60 includes one or more optical elements having one or more grating structures that enhance an optical performance of the wearable display system. As an example, one or more optical elements forming an eyepiece of the wearable display system 60, such as the waveguide stack shown in FIG. 4, can include gratings structures defined along their peripheries (e.g., along an interface between an optical element and another optical element, or along an interface between an optical element and air, such as out-coupling optical elements 570, 580, 590, 600, 610), and formed from one or more high index materials, such as such as titanium dioxide ($TiO_2$), silicon carbide (SiC), and/or lithium niobate ($LiNbO_3$). In particular, the differential dispersion of these materials can be used to achieve a uniform diffraction efficiency across the visible spectrum. This can be beneficial, for example, in fabricating of single layer eyepieces (e.g., for use in the wearable display system) that can display a high-quality multi-color image (e.g., a red-green-blue image) having high color uniformity over a wide field of view. For instance, referring to FIG. 4, each of the waveguides 270, 280, 290, 300, 310 can be configured to send image information to the eye according to multiple wavelengths of light (e.g., corresponding to a red-green-blue image).

In general, high refractive index substrates (such as $LiNbO_3$ or SiC) offer the possibility of multiplexing the full red-green-blue (RGB) spectrum onto a single layer substrate. However, the use of certain types of grating structures, such as binary or blazed structures, can result poor eyepiece performance, as such grating structures may impart color-selective properties onto the eyepiece. For instance, the grating structures may cause shorter wavelengths of light to be diffracted more efficiently compared to longer wavelengths of light. This effect can be undesirable in some circumstances. For example, this effect may make it more difficult to obtain a good color balance or uniformity in single layer RGB eyepiece while maintaining an acceptable eyepiece efficiency.

However, as described herein, the differential dispersion of certain high index materials can be used to achieve uniform diffraction efficiency across the visible spectrum. This enables the fabrication of efficient single layer RGB eyepieces exhibiting good color balance and/or uniformity that may not be achievable through other techniques. For example, in some cases, an eyepiece can be formed from wavelength selective volume holographic materials (e.g., instead of using the techniques described herein), but they may have field of view limitations stemming from their lower refractive indices (e.g., around 1.5).

In general, some materials can have similar refractive indices at a specific wavelength $\lambda_0$, while exhibiting different dispersions (e.g., refractive index with respect to wavelength). As a result, light crossing the interface between these materials will not be affected at that specific wavelength $\lambda_0$, while being affected at other wavelengths. If the interface includes a grating structure, the diffraction efficiency of that grating structure will be close to zero around wavelength $\lambda_0$, because there would be no phase modulation. However, light would be diffracted at other wavelengths, with a diffraction efficiency that is proportional to the refractive index difference between the materials.

Figure 7:
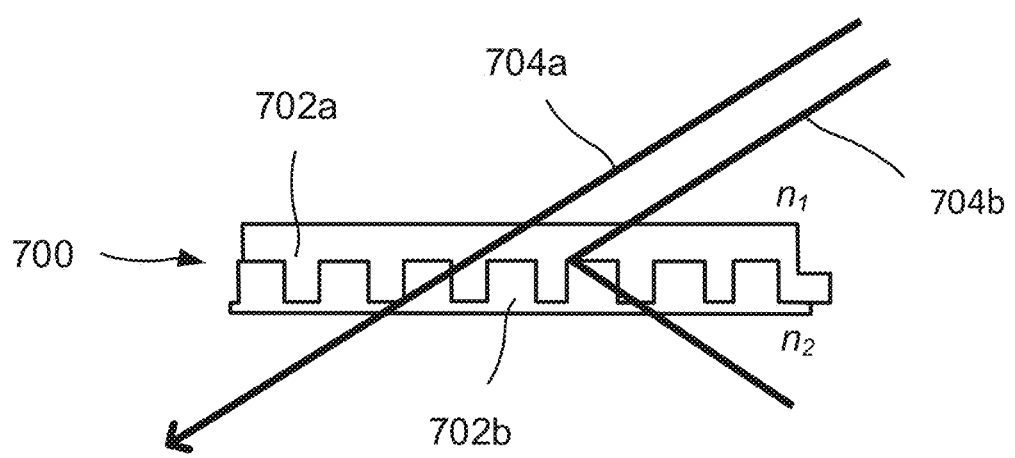
FIG. 7 shows, in cross-section, an example grating structure.

As an example, FIG. 7 shows, in cross-section, an example grating structure 700 defined at an interface between a first optical element 702a (having a refractive index of $n_1$) and a second optical element 702b (having a different refractive index $n_2$). As the diffraction efficiency of that grating structure 700 is close to zero at or around wavelength $\lambda_0$, light 704a having a wavelength $\lambda_0$ passes through the grating structure 700 with little or no diffraction. However, light 704a having a different wavelength $\lambda_1$ is diffracted as it passes through the grating structure 700, with a diffraction efficiency that is proportional to the difference in refractive index between the two materials (e.g., the difference between $n_1$ and $n_2$).

The spectral response of the grating structure is dictated, at least in part, by the refractive indices and the dispersion properties of the materials used to form the grating structure. Accordingly, a particular spectral response of the grating structure can be achieved by selecting certain materials (e.g., having certain refractive indices and the dispersion properties) to form the grating structure.

Further, spectral response of the grating structure is dictated, at least in part, by the physical dimensions of the gratings (e.g., their height, width, periodicity, duty cycle, etc.). Accordingly, a particular spectral response of the grating structure can be achieved by further forming gratings having certain dimensions using the selected materials.

Figure 8A:
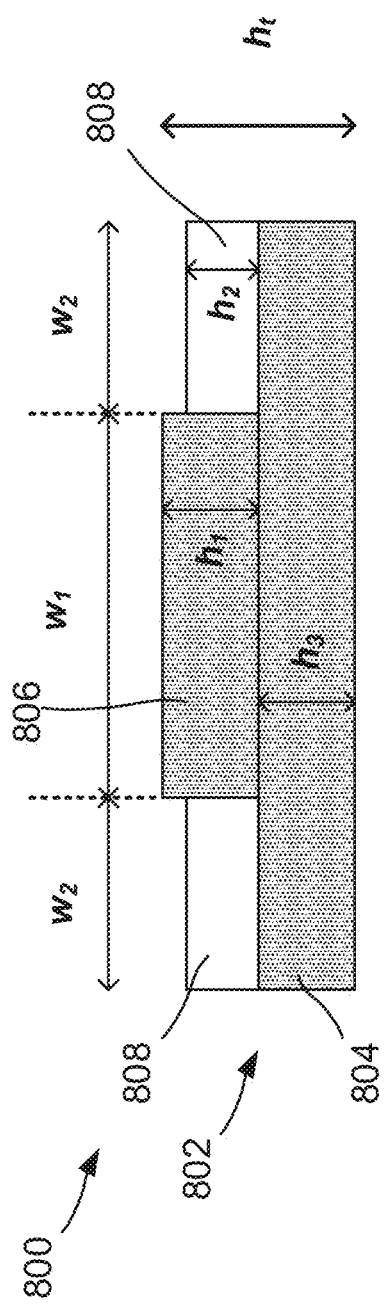
FIG. 8A shows, in cross-section, an example repeating unit of a grating structure.
Figure 8B:
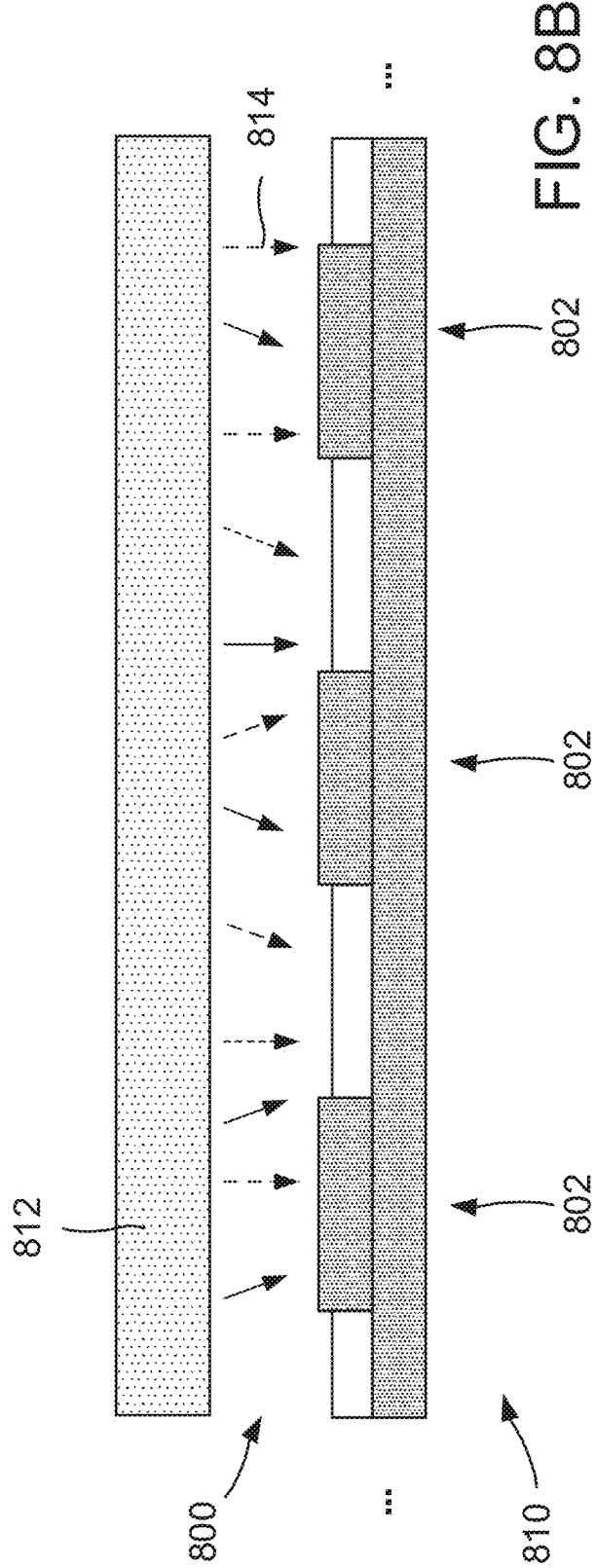

As an example, FIG. 8A shows, in cross-section, a single unit 802 of a grating structure 800. The unit 802 can repeat one or more times periodically along a periphery of an optical element (e.g., at an interface between the optical element and another optical element, or along an interface between the optical element and air). The unit 802 includes a base portion 804 composed of a first material, and protrusion 806 composed of the first material and extending from the base portion 804. The unit 802 also includes filling portions 808 composed of a second material different from the first material, and disposed on the base portion 504 along opposing sides of the protrusion 806. As shown in FIGS. 8B and 8C, the unit 802 repeats periodically along the periphery of an optical element 810, forming the grating structure 800 (e.g., a "binary" grating in filling portions disposed between each protrusion). In the example shown in FIG. 8B, the optical element 810 receives light through the grating structure 800 (e.g., from a light source 812), and light 814 incident upon the grating structure 800 is diffracted as it enters the optical element 810. In the example shown in FIG. 8C, the optical element 810 emits light 816 through the grating structure 800 (e.g., towards another optical element, into the air, and/or towards a user's eye), and light incident upon the grating structure 800 is diffracted as it exits the optical element 810. In some implementations, one or more of the out-coupling optical elements 570, 580, 590, 600, 610 (e.g., as shown in FIG. 4) can include a respective grating structure 800. In some other instantiations such as those used in waveguide displays, the light to be coupled out propagates through the substrate by total internal reflection (TIR) and is extracted from the waveguide by the grating structure.

Referring back to FIG. 8A, the unit 802 has a cross-sectional width $w_t$ (e.g., corresponding to the periodicity of the unit 802), and a cross-sectional height $h_t$ (e.g., corresponding to the maximal height of the unit 802). Further, the protrusion 506 has a cross-sectional width $w_1$ and a cross-sectional height $h_1$ (e.g., the difference in height between the top surface of the protrusion 806 and the top surface of the base portion 504). The base portion 804 has a cross-sectional width $w_t$, and a cross-sectional height $h_3$. Each filler portion 808 has a cross-sectional width $w_2$, and a cross-sectional height $h_2$.

Each of the parameters $w_t$, $w_1$, $w_2$, $h_t$, $h_1$, $h_2$, $h_2$, and $h_3$, can be selected to impart certain optical properties with respect the grating structure. Further, the materials of the base portion 804, protrusion 806, and filling portions 808 also can be selected (e.g., based at least in part on their respective refractive indices and the dispersion properties) to impart certain optical properties with respect the grating structure. In particular, if the repeating period of the grating structures is sufficiently small (e.g., between 250 nm and 400 nm), the extraction efficiency of light propagating by total interface reflection (TIR) within the substrate can be controlled with respect to wavelength.

In some implementations, these parameters can be selected such that the grating structure exhibits a diffraction efficiency that is uniform or more uniform over a particular range of incident angles of light and with respect to particular wavelengths of light (e.g., compared to grating structures designed using techniques different from those described herein). As an example, the base portion 504 and the protrusion 506 can be formed from SiC (e.g., through a deposition and etching process), and the filling portions 508 can be formed from $TiO_2$ (e.g., through a deposition process, such as sputtering). In some cases, the refractive index of the SiC portions can be between 2.65 and 2.8, and the refractive index of the TiO2 portions can be between 2.2 and 2.6. Further, the grating structure can be formed such that $w_1$ is equal to or approximately equal to 140 nm (e.g., between 80 nm and 200 nm), $w_2$ is equal to or approximately equal to 34 nm (e.g., between 30 nm and 200 nm), $h_1$ is equal to or approximately equal to 90 nm (e.g., between 40 nm and 150 nm), $h_2$ is equal to or approximately equal to 80 nm (e.g., between 40 nm and 150 nm), $w_t$ is equal to or approximately equal to 208 nm (e.g., between 150 nm and 400 nm). It should be noted that the numbers given in the example above correspond to the out-coupling of TIR-guided light within the substrate.

Figure 9A:
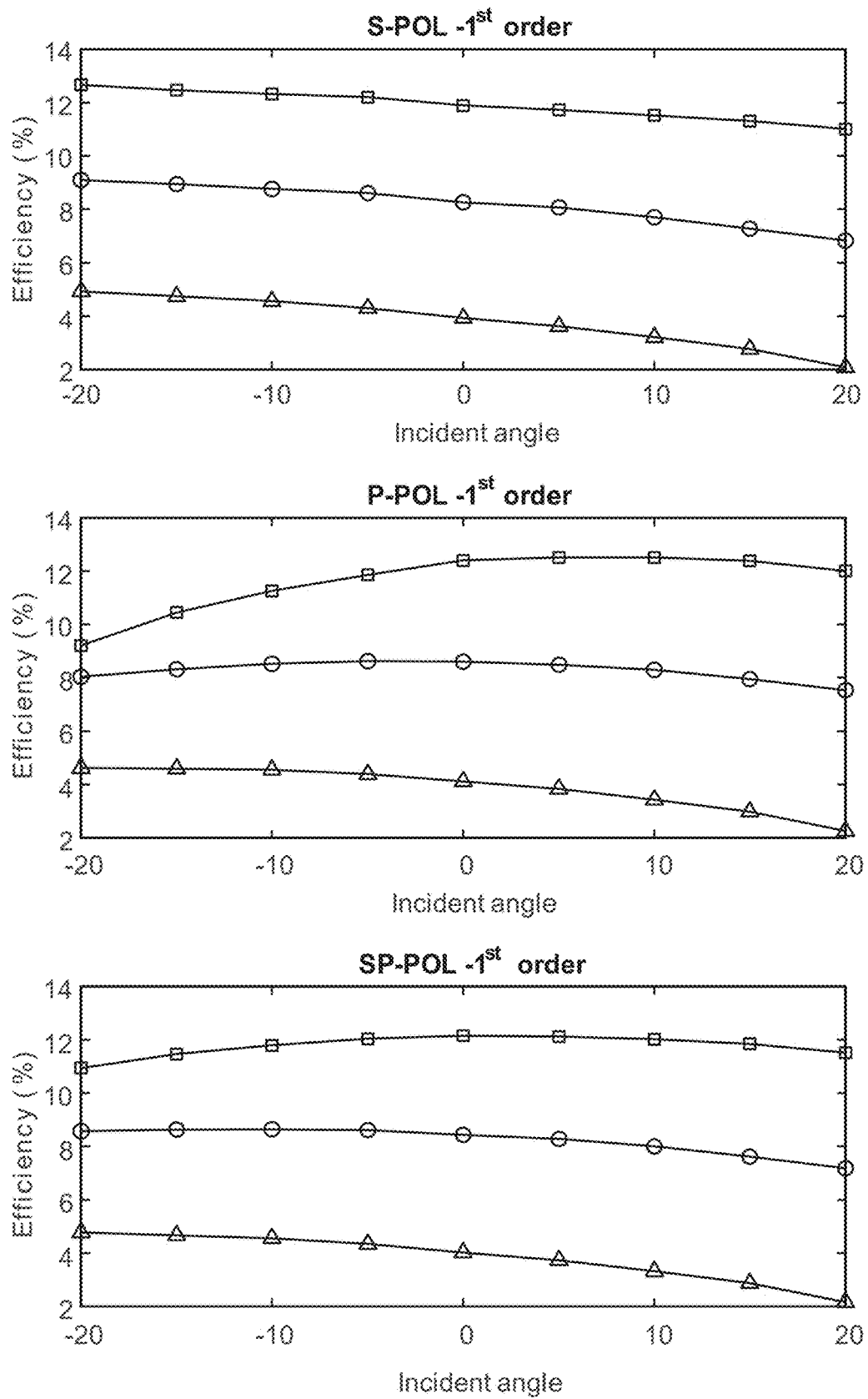
FIGS. 9A and 9B show the angular response of example grating structures.
Figure 9B:
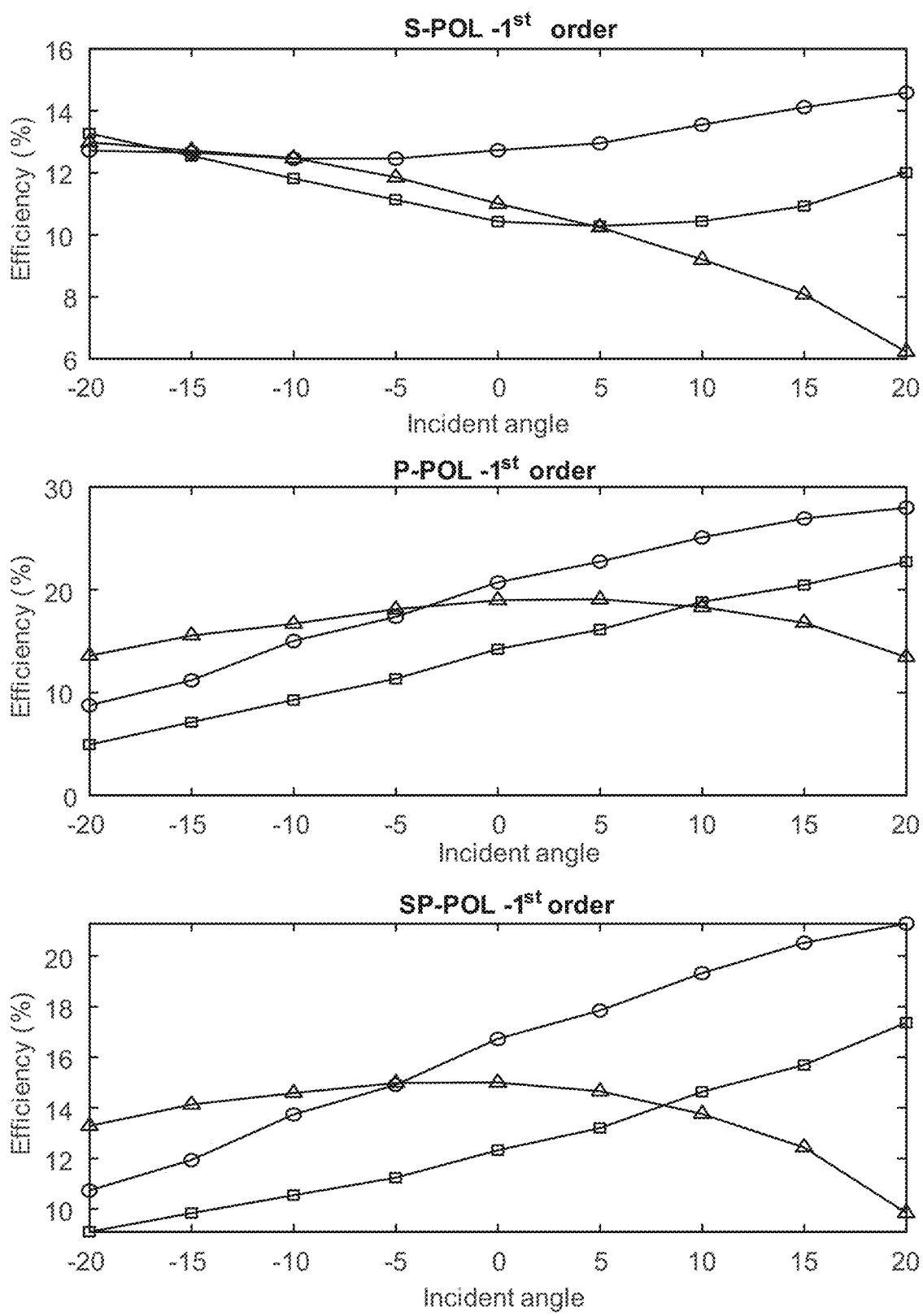

FIG. 9A shows the angular response of a binary grating structure etched in SiC (e.g., without any filling portions of $TiO_2$ deposited between the protrusions of the grating structure) with respect to three different wavelengths of light (red, green and blue). FIG. 9B shows the angular response of a similar binary grating structure etched in SiC—but also having filling portions of $TiO_2$ deposited between the protrusions of the grating structure (e.g., as shown in FIGS. 5A-5C)—with respect to the same three wavelengths of light (red, green and blue). As shown in FIGS. 9A and 9B, the addition of the filling portions of $TiO_2$ increases a diffraction efficiency of the grating structure across a range of incident angles of light (e.g., from −20° to 20°) with respect to each of the different wavelengths of light. Accordingly, light incident on the grating structures described herein exhibit are less likely to exhibit color-dependent or incident angle-dependent diffraction characteristics.

As described herein, optical elements having the grating structures described herein may be particularly suitable for use as eyepieces in a wearable display headset. For example, a wearable display headset may be configured to display multi-colored images (e.g., RGB images). Accordingly, one or more optical elements of the wearable display headset (e.g., the eyepiece and/or any other optical elements) can be formed having the grating structures described herein, such that they are less likely to exhibit color-dependent or incident angle-dependent diffraction characteristics. This can facilitate the display of multi-color images with improved uniformity (e.g., with respect to light intensity) over a wide field of view. For instance, referring to FIG. 4, one of the out-coupling optical elements 570, 580, 590, 600, 610 may be diffractive optical features, including the diffractive gratings described herein.

As an example, FIG. 10A shows an intensity map of light emitted by an eyepiece including a binary grating structure etched in SiC (e.g., without any filling portions of $TiO_2$ deposited between the protrusions of the grating structure, as described with respect to FIG. 6A). FIG. 10B shows an intensity map of light emitted by a similar binary grating structure etched in SiC—but also having filling portions of $TiO_2$ deposited between the protrusions of the grating structure (e.g., as described with respect to FIGS. 8A-8C and 9B). As shown in FIGS. 10A and 10B, the addition of the filling portions of $TiO_2$ increases the uniformity of projected light. For example, the eyepiece of FIG. 10A exhibits localized bands of high-intensity light (e.g., a C-shaped artifact of higher-intensity light surrounded by regions of lower-intensity light). In contrast, the eyepiece of FIG. 10B exhibits a more uniform light intensity pattern.

Although example parameters and materials are described here, these are merely illustrative examples. In practice, one or more parameters may differ, depending on the implementation.

Further, different materials can be used other than those described above with respect to FIGS. 8A-8C, 9A, 9B, 10A, and 1000B. As an example, in some implementations, the base portion and the protrusions of a grating structure can be composed of SiC, $LiNbO_3$, or a combination thereof. Further, the filling portions can be composed of $TiO_2$. In some implementations, the principles described herein can be applied to other combination of materials in which the waveguide substrate exhibits a higher refractive index and a lower dispersion than the coating material. Examples include diamond/LiNbO$_3$ and diamond/SrTiO$_3$ systems.

In some implementations, the refractive index of a material may vary, depending on the manner in which the material is deposited (e.g., on an underlying substrate). As an example, the refractive index of a sputtered layer of titanium dioxide can be varied between 2.25 and 2.65 by changing the deposition parameters, such as the temperature and/or the pressure at which the materials were sputtered onto the underlying material. Accordingly, the spectral response of a grating structure can be "tuned" by changing the deposition conditions of one or more materials used to define the grating structure.

Figure 11:
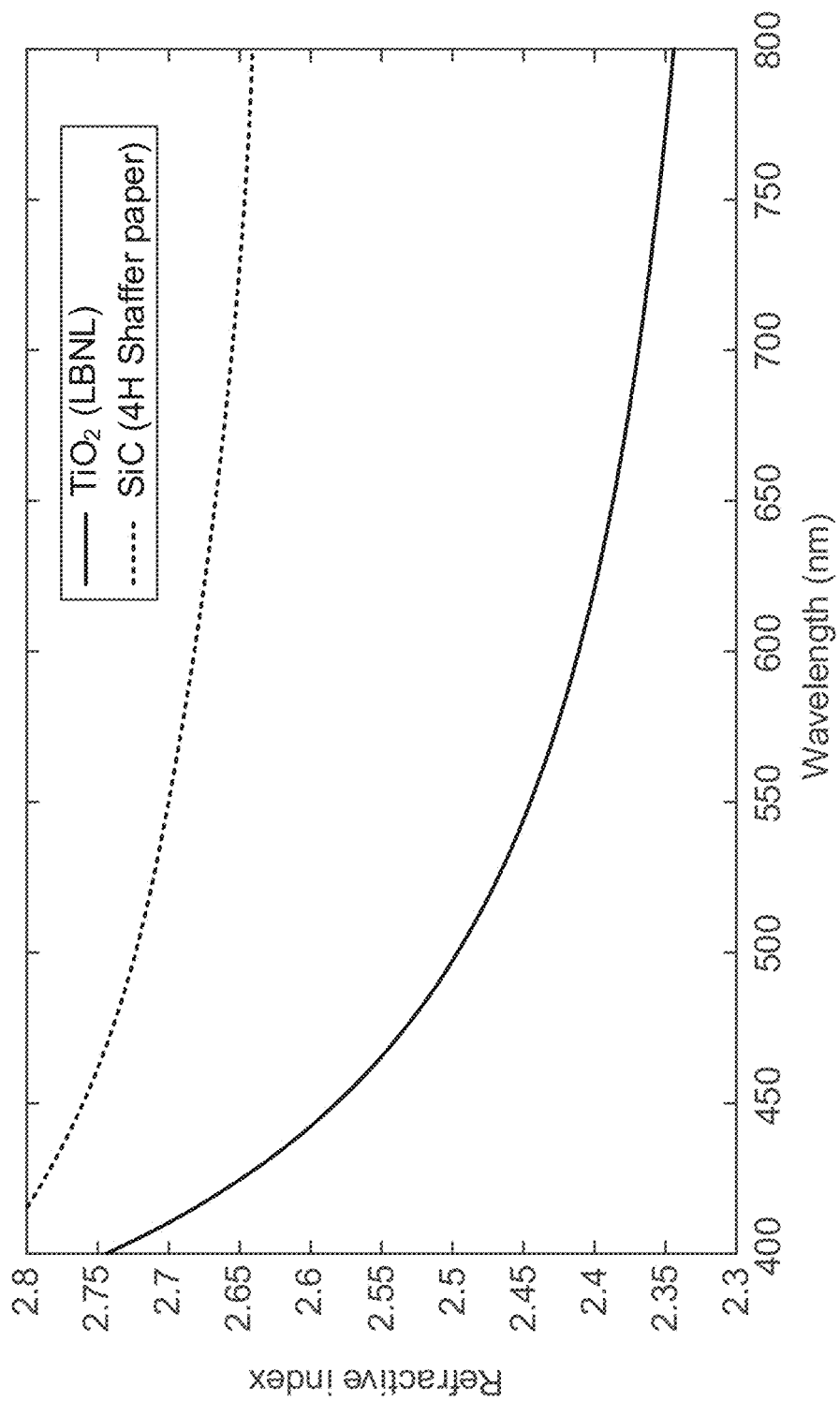
FIG. 11 shows the refractive indices of example materials used to form grating structures described herein.

As an example, FIG. 11 shows the refractive index curves of crystalline SiC and TiO$_2$ deposited according to the atomic deposition (ALD) technique. Each of these materials exhibits a refractive index that varies with respect to the incident wavelength of light (e.g., defining particular refractive index curves). These refractive index curves can be modified, at least in part, by varying the deposition parameters of each of the materials (e.g., the temperature and/or pressure when the materials are sputtered onto a substrate or other structure).

Figure 12A:
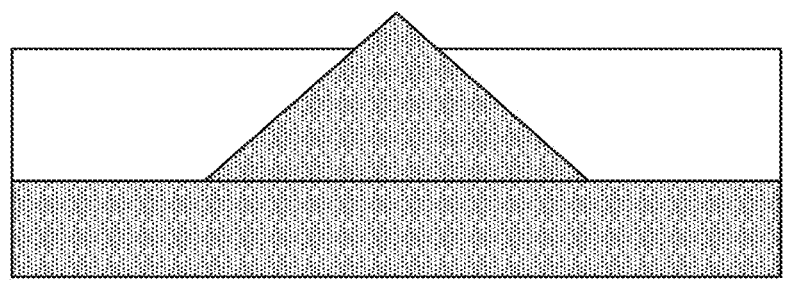
FIGS. 12A and 12B show example repeating units of a grating structure.
Figure 12B:
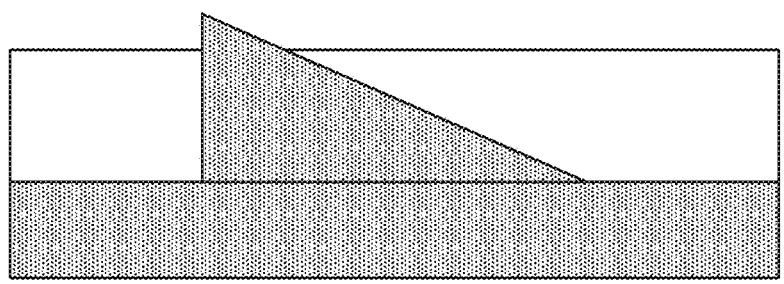

In the examples shown in FIGS. 8A-8C, each repeating unit of the grating includes a protrusion that is rectangular in cross-section (e.g., forming a binary grating). However, this need not be the case. For instance, in some implementations, each unit of the grating can include differently shaped protrusions. As an example, as shown in FIGS. 12A and 12B, each unit of a grating can include a protrusion that is rectangular in cross-section (e.g., a isosceles triangle as shown in FIG. 12A, a right triangle as shown in FIG. 12B, etc.). In practice, any other grating configurations also can be used, depending on the implementation. It should be noted that the technique is also applicable to two-dimensional diffractive lattices such as two-dimensional arrays of rods, squares, or pyramids.

Figure 13:
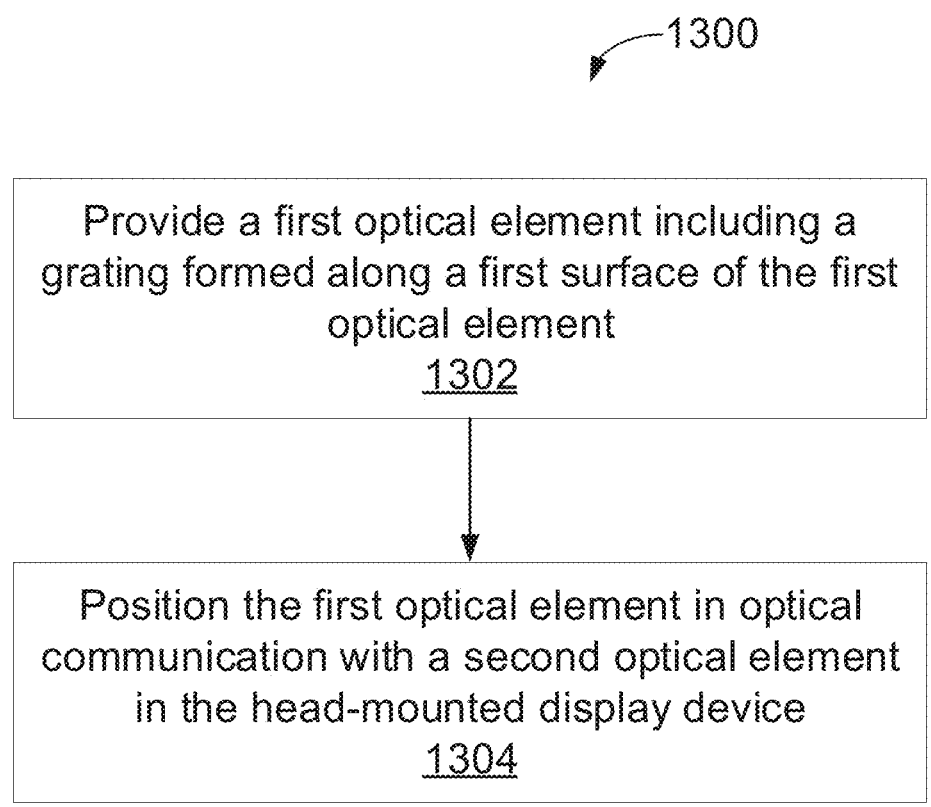
FIG. 13 is a flow chart diagrams of an example process for constructing a head-mounted display device using the optical elements and grating structures described herein

FIG. 13 shows an example process 1300 for constructing a head-mounted display device using the optical elements and grating structures described herein.

According to the process 1300, a first optical element is provided (step 1302). The first optical element includes a grating formed along a first surface of the first optical element. The grating includes plurality of protrusions including a first material having a first optical dispersion profile for visible wavelengths of light, and a second material deposited between at least some of the plurality of protrusions along the first surface of the first optical element. The second material has a second optical dispersion profile for visible wavelengths of light. Example first optical elements are shown and described with respect to FIGS. 8A-8C.

In some implementations, the second material can be titanium dioxide (TiO$_2$). In some implementation, the first material can be silicon carbide (SiC) or lithium niobate (LiNbO$_3$).

In some implementations, the grating can be formed by etching a plurality of channels onto the first optical element along the first surface. Each channel can have a first depth. Further, the second material can be deposited between at least some of the plurality of protrusions along the first surface. An example of this configuration is shown, for example, in FIGS. 8A-8C.

In some implementations, each channel can have a substantially rectangular cross-section. In some implementations, each channel can have a substantially equal width (e.g., approximately 68 nm).

In some implementations, depositing the second material can include depositing the second material into at least some of the channels.

In some implementations, depositing the second material can include sputtering the second material into at least some of the channels. The second material can be sputtered at different temperatures and/or pressures to varying the optical properties (e.g., the refractive index) of the material.

In some implementations, the second material can be deposited such that it extends a first height within the channel.

In some implementations, the first depth can be greater than the first height. As an example, the first depth can be approximately 90 nm, and the first height can be approximately 80 nm.

In some implementations, the grating can be formed according to a period along a length of the first surface. As an example, the period can correspond to a length of approximately 208 nm.

Further, the first optical element is positioned in optical communication with a second optical element in the head-mounted display device (step 1304). Example configurations of a first optical element and a second optical element in a head-mounted display device are shown and described with respect to FIGS. 1 and 4-6.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the local processing and data module 140, the remote processing module 150, and/or the remote data repository 160 can be implemented using digital electronic circuitry, or in computer software, firmware, or hardware, or in combinations of one or more of them. In another example, the process 1300 shown in FIG. 1300 can be implemented, at least in part, using digital electronic circuitry, or in computer software, firmware, or hardware, or in combinations of one or more of them (e.g., as a part of an automated or computer-assisted manufacturing process).

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 14:
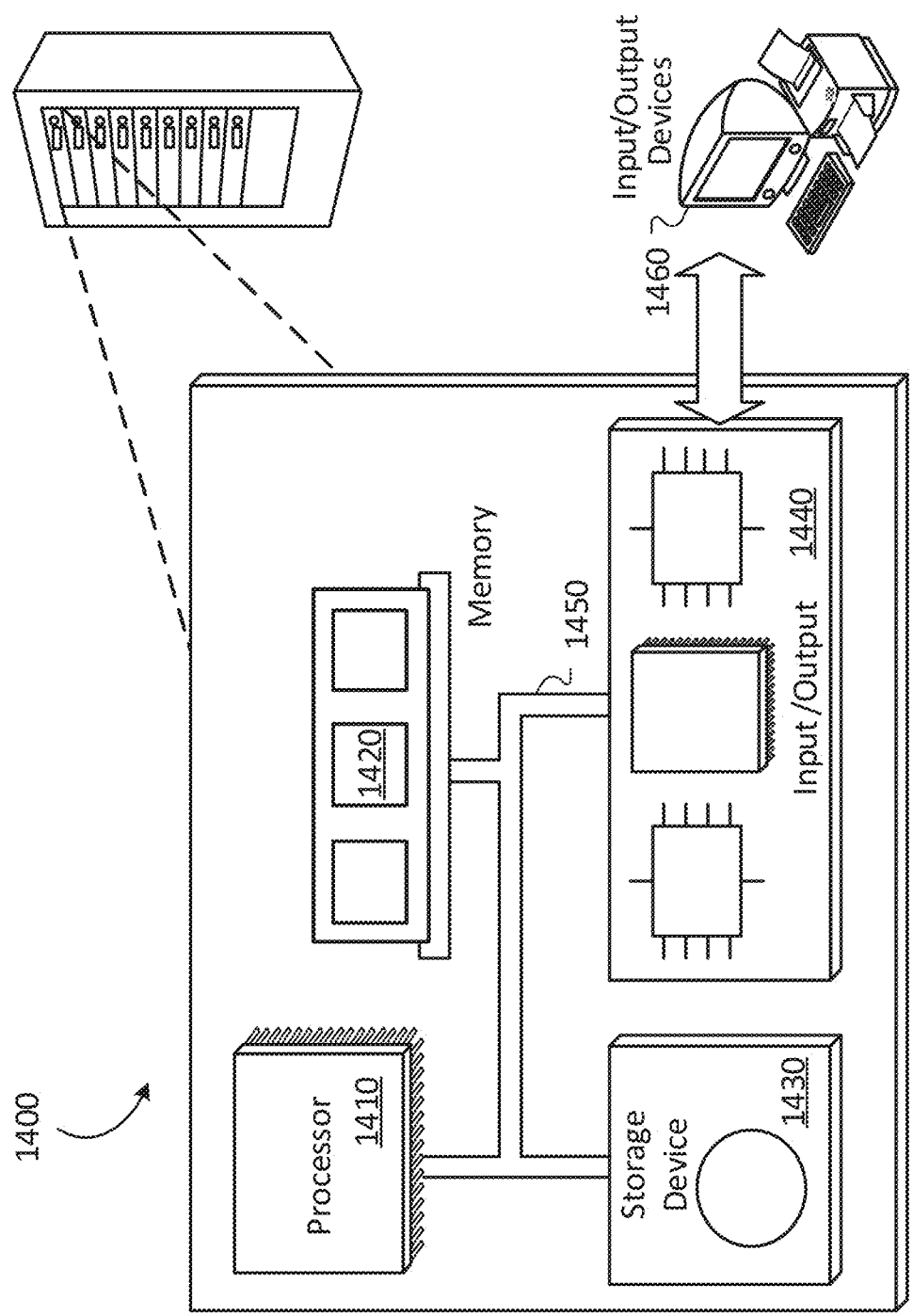
FIG. 14 is a diagram of an example computer system.

FIG. 14 shows an example computer system 1400 that includes a processor 1410, a memory 1420, a storage device 1430 and an input/output device 1440. Each of the components 1410, 1420, 1430 and 1440 can be interconnected, for example, by a system bus 1450. The processor 1410 is capable of processing instructions for execution within the system 1400. In some implementations, the processor 1410 is a single-threaded processor, a multi-threaded processor, or another type of processor. The processor 1410 is capable of processing instructions stored in the memory 1420 or on the storage device 1430. The memory 1420 and the storage device 1430 can store information within the system 1400.

The input/output device 1440 provides input/output operations for the system 1400. In some implementations, the input/output device 1440 can include one or more of a network interface device, e.g., an Ethernet card, a serial communication device, e.g., an RS-232 port, and/or a wireless interface device, e.g., an 802.11 card, a 3G wireless modem, a 4G wireless modem, etc. In some implementations, the input/output device can include driver devices configured to receive input data and send output data to other input/output devices, e.g., keyboard, printer and display devices 1460. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of implementations have been described. Nevertheless, it will be understood that various modifications may be made without departing from the spirit and scope of the invention. Accordingly, other implementations are within the scope of the following claims.

What is claimed is:
1. A system comprising:
 a plurality of optical elements in optical communication, the plurality of optical elements being stacked in a first direction, and the plurality of optical elements being configured, during operation, to project an image in a field of view of a user, wherein a first optical element of the plurality of optical elements is configured to receive light from a second optical element of the plurality of optical elements;

wherein the first optical element defines a binary grating at along a periphery of the first optical element, the binary grating comprising:

a plurality of protrusions extending from a base portion of the first optical element and towards the second optical element in the first direction, the protrusions comprising a first material having a first refractive index for a visible wavelength of light, and each of the protrusions comprising a first surface opposite the base portion of the first optical element; and a second material disposed between at least some of the plurality of protrusions along the base portion of the first optical element, the second material having a second refractive index for the visible wavelength of light, wherein there is an absence of the second material on the first surfaces of the protrusions.

2. The system of claim 1, wherein the second material comprises titanium dioxide ($TiO_2$).

3. The system of claim 2, wherein the first material comprises silicon carbide (SiC).

4. The system of claim 2, wherein the first material comprises lithium niobate ($LiNbO_3$).

5. The system of claim 1, wherein the base portion of the first optical element comprises the first material.

6. The system of claim 1, wherein the base portion of the first optical element comprises the same material as the plurality of protrusions.

7. The system of claim 1, wherein the base portion of the first optical element is integrally formed with the plurality of protrusions.

8. The system of claim 1, wherein each protrusion has a substantially rectangular cross-section.

9. The system of claim 1, wherein each protrusion extends a first height above a surface of the base portion of the first optical element, and wherein the second material extends a second height above the surface of the base portion of the first optical element, the second height being different from the first height.

10. The system of claim 9, wherein the first height is greater than the second height.

11. The system of claim 10, wherein the first height is approximately 90 nm.

12. The system of claim 11, wherein the second height is approximately 80 nm.

13. The system of claim 1, wherein the binary grating repeats according to a period along a length of the base portion of the first optical element.

14. The system of claim 13, wherein the period corresponds to a length of approximately 208 nm.

15. The system of claim 1, wherein each protrusion has a substantially equal width.

16. The system of claim 1, wherein each protrusion has a width of approximately 140 nm.

17. A method comprising:

providing a first optical element comprising a binary grating formed along a first surface of the first optical element, the binary grating comprising:

a plurality of protrusions comprising a first material having a first refractive index for a visible wavelength of light, and each of the protrusions comprising a first surface opposite a base portion of the first optical element, and a second material deposited between at least some of the plurality of protrusions along the first surface of the first optical element, the second material having a second refractive index for the visible wavelength of light, wherein there is an absence of the second material on the first surfaces of the protrusions; and positioning the first optical element in optical communication with a second optical element, such that the first optical element and the second optical element are stacked in a first direction, and such that the plurality of protrusions of the first optical element extend from the base portion of the first optical element and towards the second optical element in the first direction.

18. The method of claim 17, wherein the second material comprises titanium dioxide ($TiO_2$).

19. The method of claim 18, wherein the first material comprises silicon carbide (SiC).

20. The method of claim 18, wherein the first material comprises lithium niobate ($LiNbO_3$).

* * * * *